(12) United States Patent
Pena Gil (10) Patent No.: US 10,058,984 B2
(45) Date of Patent: Aug. 28, 2018

(54) CIRCULAR HYDRAULIC PRESS AND METHOD FOR REFORMING AND RESIZING A CHAMBER OPENING IN A COMBUSTION CHAMBER HOUSING

(71) Applicant: Raul G. Pena Gil, Miami, FL (US)

(72) Inventor: Raul G. Pena Gil, Miami, FL (US)

( * ) Notice: Subject to any disclaimer, the term of this patent is extended or adjusted under 35 U.S.C. 154(b) by 253 days.

(21) Appl. No.: 15/218,001

(22) Filed: Jul. 23, 2016

(65) Prior Publication Data

US 2018/0021846 A1    Jan. 25, 2018

(51) Int. Cl.
| | | |
|---|---|---|
| *B25B 28/00* | (2006.01) | |
| *B21K 1/26* | (2006.01) | |
| *B21D 53/84* | (2006.01) | |
| *B23P 6/00* | (2006.01) | |
| *B25B 27/02* | (2006.01) | |
| *H01R 43/042* | (2006.01) | |
| *B21D 31/00* | (2006.01) | |
| *B25B 1/20* | (2006.01) | |
| *B25B 5/14* | (2006.01) | |

(52) U.S. Cl.
CPC .............. *B25B 28/00* (2013.01); *B21D 53/84* (2013.01); *B21K 1/26* (2013.01); *B23P 6/00* (2013.01); *B25B 27/026* (2013.01); *H01R 43/0427* (2013.01); *B21D 31/00* (2013.01); *B25B 1/20* (2013.01); *B25B 5/14* (2013.01)

(58) Field of Classification Search
CPC ......... B25B 28/00; B25B 27/026; B25B 5/14; B25B 1/20; H01R 43/0427; B21K 1/26; B21D 53/84; B21D 31/00; B23P 6/00
See application file for complete search history.

(56) References Cited

U.S. PATENT DOCUMENTS

| | | | | |
|---|---|---|---|---|
| 4,233,730 A | * | 11/1980 | Godbe | .................... B25B 27/02 269/249 |
| 5,111,681 A | * | 5/1992 | Yasui | .................... B25B 27/146 29/751 |
| 5,553,478 A | * | 9/1996 | Di Troia | ............... B25B 27/146 72/1 |
| 9,180,583 B2 | * | 11/2015 | Frenken | ............... B21D 39/048 |
| 2003/0106968 A1 | * | 6/2003 | Terrill | ..................... B25B 27/10 248/58 |

* cited by examiner

*Primary Examiner* — Ryan J Walters
(74) *Attorney, Agent, or Firm* — Ruben Alcoba, Esq.

(57) ABSTRACT

A circular hydraulic press reforms and resizes a chamber opening in a combustion chamber housing. The press comprises a bar having a U-shaped end and a pair of free ends. The press comprises a panel having a C-shaped edge, a mounting edge, and a pair of slotted edges. The U-shaped end of the bar and the C-shaped edge of the panel buttress the perimeter of the chamber opening. The slotted edges and a pair of tubes on the slotted edges slidably receive the free ends of the bar to enable displacement of the panel towards the bar. A disk having a predetermined annular shape and circumference positions in the chamber opening. A hydraulic piston displaces the C-shaped edge of the panel towards the U-shaped end of the bar to press the chamber opening against the disk, and thereby reform the disk to substantially the same shape and circumference as the disk.

20 Claims, 4 Drawing Sheets

CIRCULAR HYDRAULIC PRESS AND METHOD FOR REFORMING AND RESIZING A CHAMBER OPENING IN A COMBUSTION CHAMBER HOUSING

BACKGROUND

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

The present invention is directed to a circular hydraulic press and method for reforming and resizing a combustion chamber rear support member of a jet engine; and specifically a plurality of annular chamber openings in a combustion chamber housing, by applying a unidirectional force to mold the chamber openings around a disk having a predetermined annular shape and circumference; thereby creating a substantially annular shape and a desired circumference in the chamber openings.

The inventor has worked with jet engines for many years. The inventor was familiar with the basic concept of a jet engine; knowing that it was merely a type of gas turbine engine that works by compressing air through an inlet and a compressor (axial, centrifugal, or both), mixing fuel with the compressed air, burning the mixture in a combustion chamber, and then passing the hot, high pressure air through a turbine and a nozzle. Thus, the inventor realized that the jet engine converts internal energy in the fuel to kinetic energy in the exhaust, producing thrust.

However, one specific component of the engine was brought to the attention of the inventor. The inventor recognized that the combustion chamber housing was a disk-shaped piece that contained nine chamber openings, each containing a combustion chamber, and a concentric air passage opening through which high velocity air flowed.

The inventor saw that the chamber openings often become deformed due to the high velocity air being funneled by the turbines, and the excessive heat generated during combustion of the air. This deformation creates imperfect annular shapes and incorrect circumferences for operation of the jet engine.

It came to the inventor's attention that these deformations may be especially problematic since the chamber openings contain fuel nozzles that spray fuel into the high velocity air, and the fuel may be misguided if the chamber opening is deformed. Every certain amount of time, airplane turbines are required and needed to be repaired. One of the parts with more attention and very time consuming in the process, are the combustion chambers and supports. Thus, the inventor concluded that due to high temperature and pressure the combustion chambers rear support gets deformed and a delicate work is needed to be done.

The inventor observed that this process of resizing chamber openings was being mainly done, manually using hammers and impact tools. Few fully equipped shops might use heavy hydraulic table tools. Either ways, the process was very slow taking longs hours, even days depending of the level of deformation in the nine holder. The inventor also saw that this manual reforming created inaccurate dimensions and lots of gaps and the perfect circumference of the chamber openings was difficult to obtain.

The inventor decided to design a press that would mold the chamber opening around a disk having a predetermined annular shape and circumference, such as that was desired from the chamber opening.

Through additional research, the inventor learned that a hydraulic pump and piston were effective for applying a unidirectional force on the perimeter of the chamber opening. The chamber opening could be molded to fit around a disk having a predetermined annular shape and circumference that fit the specifications of the chamber opening.

Nonetheless, the inventor realized that an apparatus was needed to press the chamber opening around the disk. The inventor designed a bar having a U-shaped end and a panel having a C-shaped edge. The "U" and "C" shapes could be brought together around the chamber opening, forming a generally annular shape. The hydraulic piston was used to displace the panel towards the rod.

Unfortunately, the inventor realized that different types of chamber openings required different amounts of force. Excessive force tended to crimp the chamber opening, while if the force was too little, the chamber opening could not be molded around the disk. The inventor decided to add manual force adjustment members that could be rotated to displace the panel, either towards or away from the chamber opening.

For the foregoing reasons, there is a hydraulic press and method for reforming and resizing a chamber opening in a combustion chamber housing for a jet engine. Metal reforming and resizing tools have been utilized in the past; yet none with the characteristics of the present invention. See U.S. Pat. Nos. 2,889,578; 3,698,273; and 7,174,862.

For the foregoing reasons, there is a delivery method and device that allows a delivery vehicle to pass through a resident lane in a private community and avoid a guest lane through the use of an identifying signal emitted from a transponder or through optical character recognition technology of a license plate.

SUMMARY

The present invention describes a circular hydraulic press and method for reforming and resizing a chamber opening in a combustion chamber housing for a jet engine. The circular hydraulic press is configured to reform and resize a plurality of annular chamber openings in a combustion chamber housing by applying a unidirectional force to mold the chamber openings around a disk having a predetermined annular shape and circumference; thereby creating a substantially annular shape and a desired circumference in the chamber openings. This reforming and resizing may be necessary, as the chamber openings are often deformed due to heat and pressure during operation of a jet engine. The circular hydraulic press is sufficiently lightweight and portable, so as to enable reforming and resizing of multiple chamber openings in the combustion chamber housing.

The circular hydraulic press is configured to apply an adjustable, unidirectional force against the perimeter of the chamber openings, which is pressed against a disk having a predetermined annular shape and circumference. In this manner, the chamber opening is molded into substantially the same annular shape and circumference of the disk; therefore achieving the desired annular shape and circumference. The circular hydraulic press applies the unidirectional force through both hydraulic power and enables both hydraulic and manual adjustments to the amount of unidirectional force, so as to provide a uniform application of unidirectional force on the chamber opening. This unique capacity of dual adjustments helps achieve a more precise annular shape and circumferential size for the chamber openings.

In some embodiments, the circular hydraulic press may include a bar defined by a generally U-shaped end and a pair of free ends. The U-shaped end of the bar has a radius of about 3.25". The press further comprises a panel defined by a generally C-shaped edge, a mounting edge, and a pair of slotted edges. The C-shaped edge of the panel has a radius of about 3.247 inches. The C-shaped edge of the panel may be displaced proximal to the U-shaped end of the bar, pressing against the perimeter of the chamber opening.

The circular hydraulic press further includes a disk that is defined by a predetermined annular shape and circumference. This annular shape and circumference is substantially the desired shape and circumference for the chamber opening. In one embodiment, the disk forms a snug fit inside the chamber opening. The disk is configured to position inside the chamber opening, approximately between the U-shaped end of the bar and the C-shaped edge of the panel.

The C-shaped edge of the panel and the U-shaped end of the bar chamber forcibly press the perimeter of the chamber opening against the disk to mold the chamber opening into substantially the same annular shape and circumference of the disk. The disk may include a handle for facilitated manipulation thereof.

The pair of slotted edges from the panel have slots that enable slidable engagement with the pair of free ends of the bar. In some embodiments, a pair of tubes fixedly position along the pair of slotted edges of the panel, in a generally parallel relationship. The tubes are configured to receive the pair of free ends of the bar. Thus, the pair of free ends from the bar slide through the slots in the slotted edges and into the tubes. When the C-shaped edge of the panel and the U-shaped end of the bar are at their closest possible proximity, a generally annular contour forms around the chamber opening.

In some embodiments, a hydraulic piston axially engages the mounting edge of the bracket. The hydraulic piston is configured to telescopically extend to forcibly displace the C-shaped edge of the panel towards the U-shaped end of the bar. This is necessary when reforming the chamber opening. Conversely, the hydraulic piston is configured to telescopically retract to displace the C-shaped edge of the panel away from the U-shaped end of the bar. This is necessary when completing reformation of the chamber opening.

A hydraulic pump generates the unidirectional force on the hydraulic piston to enable extension and retraction thereof. Through actuation from the hydraulic pump, the hydraulic piston is configured to extend and apply a unidirectional force on the panel, so as to displace the C-shaped edge of the panel towards the U-shaped end of the bar. The unidirectional force is sufficiently uniform and strong to press the chamber opening against the disk, and therefore achieve the desired annular shape and circumference.

Further, the unidirectional force applied to the panel is both hydraulically and manually adjustable. The unidirectional force can be increased or decreased. This adjustability works to reform and resize the chamber opening to a desired annular shape that substantially matches the shape and circumference of the disk.

In some embodiments, a bracket having a plurality of fastening apertures and a plurality of adjustment apertures is disposed in a linear arrangement with the hydraulic piston. At least one fastener passes through the fastening apertures of the bracket to fasten the bracket to the hydraulic piston. At least one stand attaches to the bracket for supporting the circular hydraulic press to the height of the combustion chamber housing for reforming and resizing the chamber openings.

In some embodiments, at least one force adjustment member passes through the adjustment apertures in the bracket to engage the mounting edge of the panel. The force adjustment members may be rotated to increase and decrease the unidirectional force of the panel against the bar. For example, rotating the force adjustment members in a first direction increases the unidirectional force, and rotating the force adjustment members in a second direction decreases the unidirectional force. Thus, both the hydraulic pump and the force adjustment members may be used to increase or decrease the unidirectional force against the perimeter of the chamber opening.

In operation, a combustion chamber housing comprises nine chamber openings arranged in a circle around a concentric air passage opening. This is one possible jet engine configuration known in the art. The chamber openings may become deformed due to the high velocity air being funneled by the turbines, and the excessive heat generated during combustion of the air.

The circular hydraulic press is portable and lightweight, and thus may be used to reform and resize any and all of the chamber openings and the central air passage opening in a single operation. The press is supported on at least one stand that rests adjacently to the desired chamber opening for reforming. The panel and the bar are positioned around the perimeter of the chamber opening. The C-shaped edge of the panel and the U-shaped end of the bar buttress the perimeter of the chamber opening. The disk positions in the chamber opening, forming a snug fit in the chamber opening. The disk dictates the desired annular shape and circumference of the chamber opening.

A hydraulic pump is powered to actuate a hydraulic piston against the mounting edge of the panel. The hydraulic piston telescopically extends in response to the hydraulic pump, creating an axial, unidirectional force that presses the panel towards the bar, and against the perimeter of the chamber opening.

Consequently, the chamber opening is pressed inwardly against the disk, conforming to the annular shape and circumference of the disk. This reformation of the chamber opening may include minute reformations of the generally annular shape of the chamber opening. Each chamber opening and the air passage opening is reformed and resized in this same manner.

One objective of the present invention is to reform and resize a plurality of annular opening in a combustion chamber housing to a desired annular shape and circumference.

Another objective of the present invention is to utilize hydraulic pressure to apply a unidirectional force against the inner surface of the annular openings.

Another objective of the present invention is to provide a portable press that can be easily moved between multiple chamber openings for reforming and resizing.

Yet another objective of the present invention is to expedite the process of reforming and resizing chamber openings in a combustion chamber opening, without requiring the use of hammers, impact tools, and time consuming physical exertion.

Yet another objective is to provide a portable and lightweight tool for reforming and resizing chamber openings in a combustion chamber opening.

Yet another objective is to provide an inexpensive to manufacture hydraulic press for reforming and resizing a combustion chamber housing.

DRAWINGS

These and other features, aspects, and advantages of the present invention will become better understood with regard to the following description, appended claims, and drawings where:

DESCRIPTION

The present invention is directed to a circular hydraulic press 200 and method 600 for reforming and resizing a chamber opening 104 in a combustion chamber housing 100 for a jet engine, as referenced in FIGS. 1-6. The circular hydraulic press 200 is configured to reform and resize a plurality of annular chamber openings 104 in a combustion chamber housing 100 by applying a unidirectional force directly on the chamber opening 104, and thereby mold the chamber openings 104 around a disk 240 having a predetermined annular shape and circumference. This causes the chamber opening 104 to conform to the annular shape and circumference of the disk 240, which is the desired annular shape and circumference desired for a chamber opening 104.

Those skilled in the art will recognize that a jet engine is a type of gas turbine engine that works by compressing air through an inlet and a compressor (axial, centrifugal, or both), mixing fuel with the compressed air, burning the mixture in a combustion chamber, and then passing the hot, high pressure air through a turbine and a nozzle. All the air ingested by the inlet is passed through the compressor, combustor, and turbine. The jet engine converts internal energy in the fuel to kinetic energy in the exhaust, producing thrust.

It is known in the art that a jet engine has a primary fuel manifold that feeds fuel to the chamber openings 104 through a series of secondary fuel manifolds. The secondary fuel manifolds serve to carry the fuel to fuel nozzles in the chamber openings 104. The fuel nozzles spray fuel in predetermined amounts onto the high velocity air flowing through the combustion chamber. This is one reason why chamber openings must have precise annular shapes and circumference, as deformed chamber opening does not efficiently enable passage of high velocity air, and does not accurately spray fuel towards the air flow to enable optimal combustion.

Figure 1:
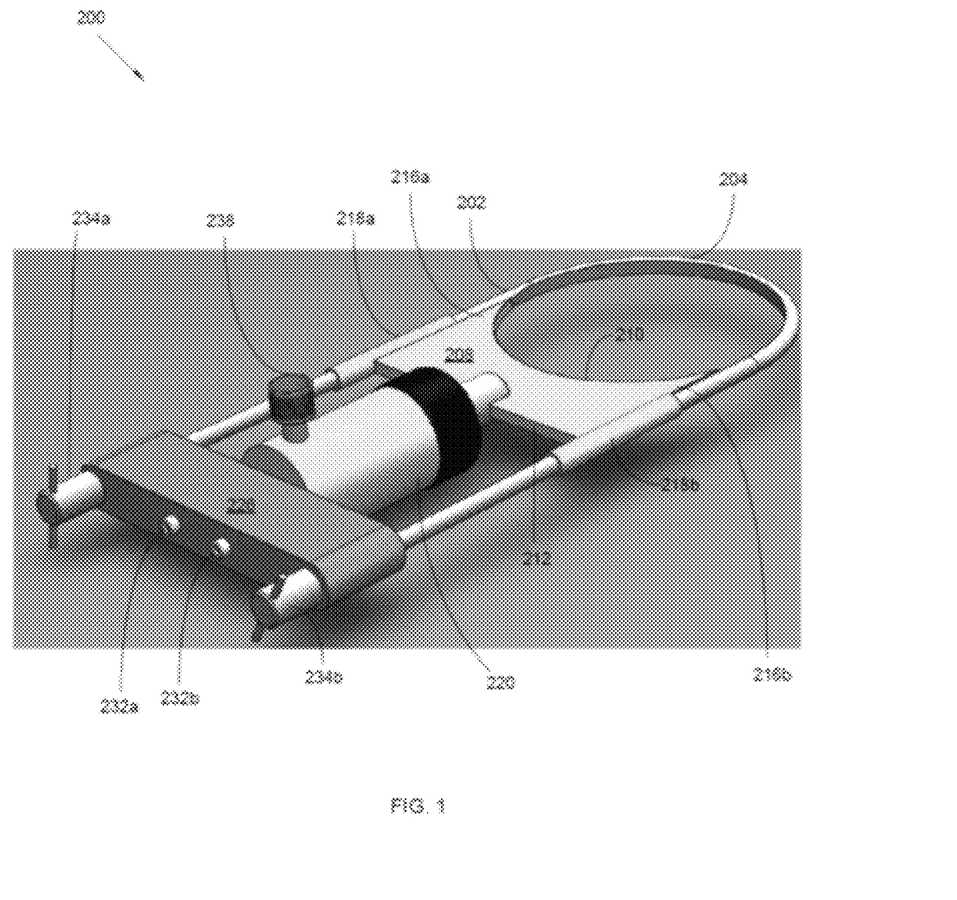
FIG. 1 is a perspective view of an exemplary circular hydraulic press for reforming and resizing a chamber opening in a combustion chamber housing.

Continuing with the jet engine depiction in FIG. 1, a drain tube releases excess fuel that has not been fully burned in the combustion chamber. The combustion chamber is encased in an air casing that houses the interior region and helps insulate the combustive process against irregular air drafts and excessive heat. Furthermore, since nine combustion chambers are typically used in a jet engine, an interconnector connects multiple combustion chambers to enable selective flow of air and fuel therebetween. An engine fire seal may also be used to seal each combustion chamber, creating independent operation of each combustion chamber.

It is also known by those skilled in the art that reforming and resizing the chamber openings 104 in the combustion chamber housing 100 is necessary after a duration, as the chamber openings 104 are often deformed due to heat and pressure during operation of the jet engine. Since the chamber openings 104 enable passage of high velocity, compressed air, and also provide fuel nozzles that spray the air, the correct annular shape and circumference of the chamber openings 104 enables more efficient fuel consumption and net thrust of the jet engine during operation.

The efficiency of a properly sized chamber opening 104 is evidenced by reviewing the net thrust ($F_N$) of the jet engine, which is given by:

$$F_N = (m_{air} + m_{fuel})v_e - m_{air}v$$

where, $m_{air}$ = the mass rate of air flow through the engine
$m_{fuel}$ = the mass rate of fuel flow entering the engine
$v_e$ = the velocity of the jet (the exhaust plume) assumed less than sonic velocity
$v$ = the velocity of the air intake = the true airspeed of the aircraft
$(m_{air} + m_{fuel})v_e$ = the nozzle gross thrust ($F_G$)

Thus, as the equation explains, when the fuel is not properly sprayed onto the air flow, or the air flow is slightly diverted due to a deformed combustion chamber opening 104, the net thrust by the jet engine is reduced. Consequently, the rate of flow of fuel entering the jet engine becomes very small compared with the rate of flow of air. The circular hydraulic press 200 attempts to alleviate this problem with a lightweight and portable "molding tool" that enables expedited reforming and resizing of multiple chamber openings 104 and an air passage opening in the combustion chamber housing 100.

This is possible because the circular hydraulic press 200 rests adjacently to a chamber opening 104 and applies an adjustable, unidirectional force against a perimeter of the chamber opening 104. The unidirectional force is sufficiently strong, so as to press the chamber opening 104 inwardly, against a disk 240 having a predetermined annular shape and circumference. In this manner, the chamber opening 104 is molded into substantially the same annular shape and circumference of the disk 240; therefore achieving the desired annular shape and circumference for optimal operation of the combustion chamber.

The circular hydraulic press 200 applies the unidirectional force through hydraulic power, which is powerful enough to reform metal components of a jet engine. The unidirectional force can be adjusted, both hydraulically and manually, so as to provide a uniform application of unidirectional force directly on the chamber opening 104. This unique capacity of dual adjustability of the unidirectional force helps achieve a more precise annular shape and circumferential size for the chamber openings 104.

Looking now at FIG. 1, the circular hydraulic press 200 comprises a bar 202 that is defined by a generally U-shaped end 204 and a pair of free ends 206a, 206b. The U-shaped end 204 of the bar 202 has a radius of about 3.25". Though, depending on the type of chamber opening 104, the radius may be different in other embodiments. In one embodiment, the bar 202 has a diameter of about ⅜", and the free ends 206a, 206b of the bar 202 have a ⅜"-16 thread.

The circular hydraulic press 200 further comprises a panel 208 defined by a generally C-shaped edge 210, a mounting edge 212, and a pair of slotted edges 216a, 216b. The panel 208 works in conjunction with the bar 202 to apply the unidirectional force around the perimeter 102 of the chamber opening 104.

The C-shaped edge 210 of the panel 208 has a radius of about 3.247 inches. Though, depending on the type of chamber opening 104, the radius may be different in other embodiments. The C-shaped edge 210 of the panel 208 may be displaced towards the U-shaped end 204 of the bar 202, pressing against the perimeter 102 of the chamber opening 104. The mounting edge 212 of the panel 208 may include a notch 214 for receiving a hydraulic piston 220, as described below. In one embodiment, the panel 208 is a metal sheet that has sufficient durability to press against the perimeter of the chamber opening 104 and cause reformation thereof.

Figure 2:
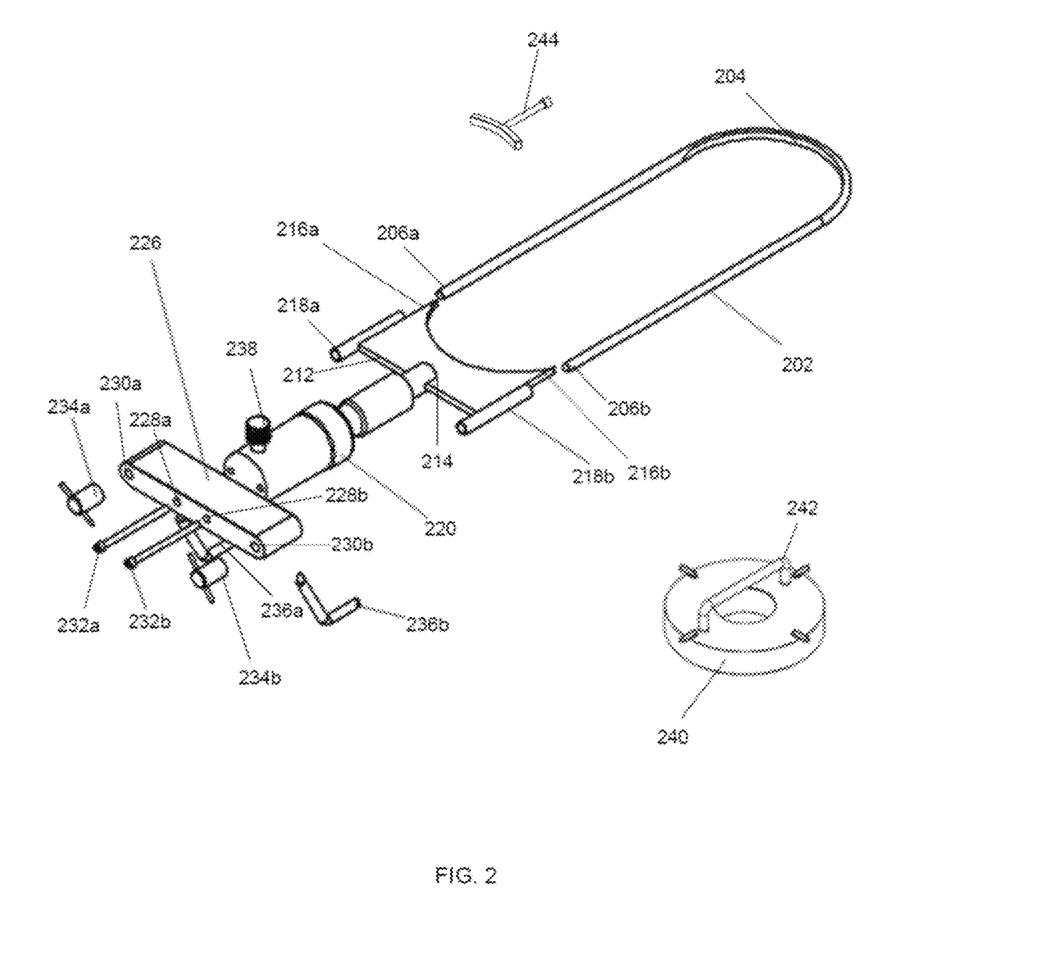
FIG. 2 is a blow up view of the circular hydraulic press, shown in FIG. 1.

As FIG. 2 illustrates, the circular hydraulic press 200 further includes a disk 240 that is defined by a predetermined annular shape and circumference. This annular shape and circumference is substantially the desired shape and circumference for the chamber opening 104. In one embodiment, the disk 240 forms a snug fit inside the chamber opening 104. The disk 240 is configured to position inside the chamber opening 104, approximately between the U-shaped end 204 of the bar 202 and the C-shaped edge 210 of the panel 208.

The C-shaped edge 210 of the panel 208 and the U-shaped end 204 of the bar 202 chamber forcibly press the perimeter of the chamber opening 104 against the disk 240 to mold the chamber opening 104 into substantially the same annular shape and circumference of the disk 240. The disk 240 may include a handle 242 for facilitated manipulation thereof. The disk 240 may include a metal disk 240 having sufficient weight, thickness, and durability to resist the unidirectional force applied to the chamber opening 104.

The pair of slotted edges 216a, 216b from the panel 208 have lateral slots that enable slidable engagement with the pair of free ends 206a, 206b of the bar 202. The free ends 206a, 206b slide into the slots to engage the panel 208. In some embodiments, a pair of tubes 218a, 218b fixedly position along the pair of slotted edges 216a, 216b of the panel 208, in a generally parallel relationship. In one embodiment, the tubes 218a, 218b have a diameter of about ⅜". The tubes 218a, 218b are configured to receive the pair of free ends 206a, 206b of the bar 202 in a free moving relationship.

Thus, the pair of free ends 206a, 206b slide through the slots in the slotted edges 216a, 216b and into the tubes 218a, 218b. When the C-shaped edge 210 of the panel 208 and the U-shaped end 204 of the bar 202 are at their closest possible proximity, a generally annular contour forms around the chamber opening 104.

In some embodiments, the circular hydraulic press 200 utilizes a hydraulic piston 220 to axially engage the mounting edge 212 of the bracket 226. Those skilled in the art will recognize that a hydraulic piston 220 is a mechanical actuator that is used to give a unidirectional force through a unidirectional stroke. A hydraulic fluid, such as oil or water, actuates the hydraulic piston 220.

In some embodiments, the hydraulic piston 220 may telescopically extend to forcibly displace the C-shaped edge 210 of the panel 208 towards the U-shaped end 204 of the bar 202. This is necessary when reforming the chamber opening 104. Conversely, the hydraulic piston 220 is configured to telescopically retract to displace the C-shaped edge 210 of the panel 208 away from the U-shaped end 204 of the bar 202. This is necessary when completing reformation of the chamber opening 104. A release knob 238 may be manipulated to release hydraulic fluid from the hydraulic piston 220 to enable retracting.

Figure 3:
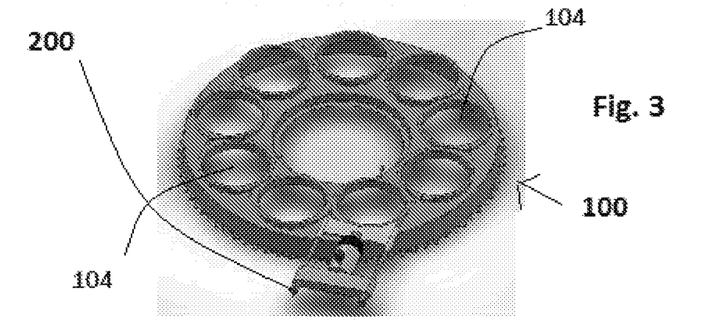
FIG. 3 is a perspective view of a circular hydraulic press reforming a first chamber opening in a first position.

As illustrated in FIG. 3, a hydraulic pump 222 generates the unidirectional force on the hydraulic piston 220 to enable extension and retraction thereof. Through actuation from the hydraulic pump 222, the hydraulic piston 220 is configured to extend and apply a unidirectional force on the panel 208, so as to displace the C-shaped edge 210 of the panel 208 towards the U-shaped end 204 of the bar 202. Because the unidirectional force is hydraulically generated, it is sufficiently uniform and strong to mold the chamber opening 104 around the disk 240 to specifications of the predetermined annular shape and circumference.

Further, the unidirectional force applied to the panel 208 is both hydraulically and manually adjustable. In this manner, the unidirectional force can be increased or decreased. This adjustability works to reform and resize the chamber opening 104 to a desired annular shape that substantially matches the shape and circumference of the disk 240. For example, greater force may be needed for a chamber opening having a thick sheet metal.

The circular hydraulic press 200 further comprises a bracket 226. In some embodiments, the bracket 226 may be an elongated block having dimensions of about 8"×2"×1". A plurality of fastening apertures 228a, 228b and a plurality of adjustment apertures 230a, 230b pass through the bracket 226. The apertures 228a, 228b, 230a, 230b are disposed in a generally linear alignment with the hydraulic piston 220.

At least one fastener 232a, 232b passes through the fastening apertures 228a, 228b of the bracket 226 to fasten the bracket 226 to the hydraulic piston 220. In some embodiments, the at least one fastener 232a, 232b comprises two socket head cap screws having dimensions of about 0.25"× 3.5"×1". The fastener 232a, 232b may include a screw, a bolt, a friction fit mechanism, a weld, and a magnet. A fastening tool 244, such as a screw driver, may be used to manipulate the fastener 232a, 232b.

At least one stand 236a, 236b attaches to the bracket 226 for supporting the circular hydraulic press 200 to the height of the combustion chamber housing 100 to enable portable and convenient reforming and resizing of the chamber openings 104. The stand 236a, 236b helps carry the hydraulic device to the level of the chamber opening 104 for pressing operations.

In one embodiment, the at least one stand 236a, 236b may include two L-shaped rods that balance the entire weight of the circular hydraulic press 200 during operation. In one possible embodiment, the at least one stand 236a, 236b has dimensions of about ⅜"×2.754". In another embodiment, the stand 236a, 236b is height adjustable.

In some embodiments, at least one force adjustment member 234a, 234b passes through the adjustment apertures 230a, 230b in the bracket 226 to engage the mounting edge 212 of the panel 208. The force adjustment member 234a, 234b may be rotated to increase and decrease the unidirectional force of the panel 208 against the bar 202. For example, rotating the force adjustment member 234a, 234b in a first direction increases the unidirectional force, and rotating the force adjustment member 234a, 234b in a second direction decreases the unidirectional force.

Thus, both the hydraulic pump 222 and the force adjustment member 234a, 234b may be used to increase or decrease the unidirectional force against the perimeter of the chamber opening 104. In one embodiment, the at least one force adjustment member 234a, 234b is two ⅜" fast nuts. The force adjustment member 234a, 234b may include also a screw, a bolt, a friction fit mechanism, and a bracket 226.

Figure 4:
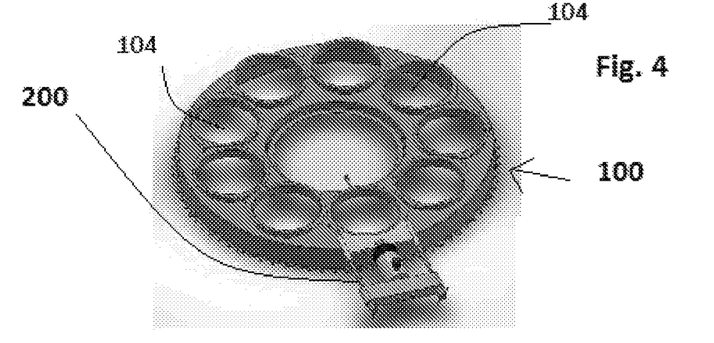
FIG. 4 is a perspective view of a circular hydraulic press reforming a first chamber opening in a second position.
Figure 5:
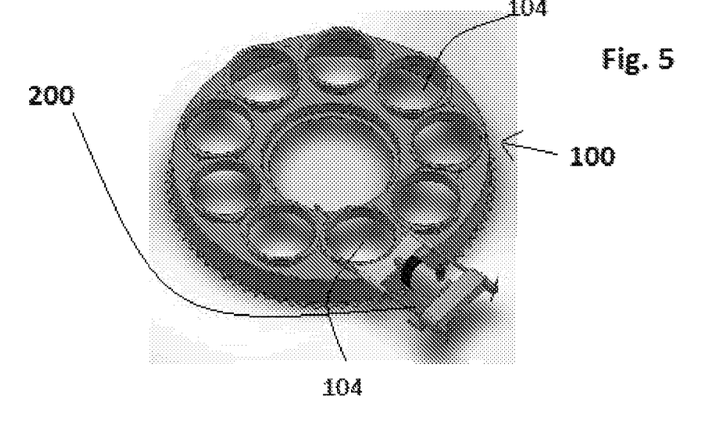
FIG. 5 is a perspective view of a circular hydraulic press reforming a first chamber opening in a third position.
Figure 6:
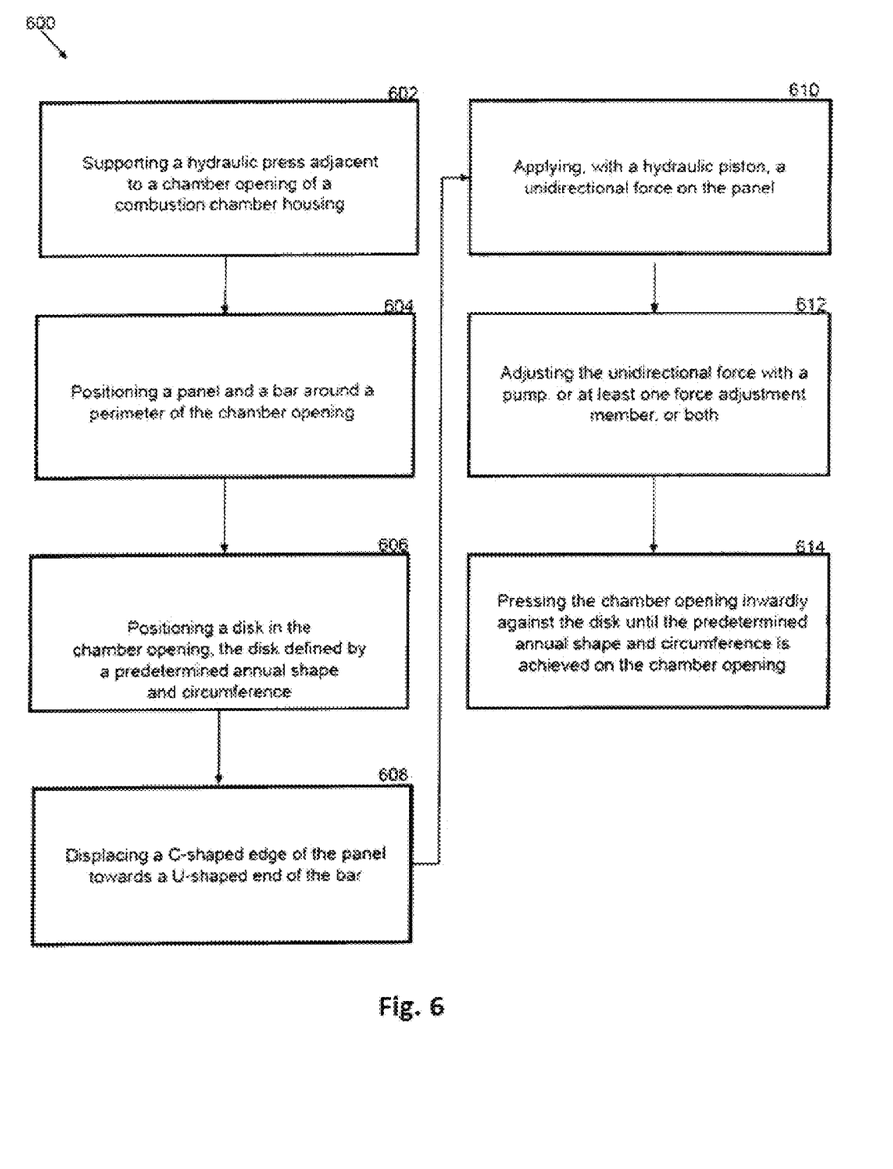
FIG. 6 is a flowchart diagram of an exemplary method for reforming and resizing a chamber opening in a combustion chamber housing.

In operational use shown in FIGS. 3-5, a combustion chamber housing 100 comprises nine chamber openings 104 arranged in a circle around a concentric air passage opening. This is one possible jet engine configuration known in the art. The chamber openings 104 may become deformed due to the high velocity air being funneled by the turbines, and the excessive heat generated during combustion of the air. This deformation creates imperfect annular shapes and incorrect circumferences for operation of the jet engine. These deformations may be especially problematic since the chamber openings 104 contain fuel nozzles that spray fuel into the high velocity air, and the fuel may be misguided if the chamber opening 104 is deformed.

The circular hydraulic press 200 is portable and lightweight, and thus may be used to reform and resize any and all of the chamber openings 104 and the central air passage opening in a single operation. The press is supported on at least one stand 236a, 236b that rests adjacently to the desired chamber opening 104 for reforming. The panel 208 and the bar 202 are positioned around the perimeter 102 of the chamber opening 104. The C-shaped edge 210 of the panel 208 and the U-shaped end 204 of the bar 202 buttress the perimeter 102 of the chamber opening 104. The disk 240 positions in the chamber opening 104, forming a snug fit in the chamber opening 104. The disk 240 dictates the desired annular shape and circumference of the chamber opening 104.

The pump 222 actuates the hydraulic piston 220. The hydraulic piston 220 telescopically extends in response to the hydraulic pump 222, creating an axial, unidirectional force that presses the panel 208 towards the bar 202, and against the perimeter of the chamber opening 104. The pump 222 may include a hydraulic pump 222 known in the art. The pump 222 may operatively connect to a hydraulic line 224 that carries hydraulic fluid to the hydraulic piston 220.

As a result of the piston 220 extending against the panel 208, the U-shaped end 204 of the bar 202 and the C-shaped edge 210 of the panel are moved towards each other, causing the chamber opening 104 to be pressed inwardly against the disk 240. Under this stress, the chamber opening 104 conforms to the annular shape and circumference of the disk 240. This hydraulic powered reformation of the shape and circumference of the chamber opening 104 enables a more uniform reformations of the generally annular shape of the chamber opening 104, than traditionally applied with hammers and impact tools. Each chamber opening 104 and the air passage opening in the combustion chamber housing 100 may be reformed and resized in this same manner.

FIG. 5 illustrates a flowchart diagram of a method 600 for reforming and resizing a chamber opening 104 in a combustion chamber housing 100. The method 600 may include an initial Step 602 of supporting a circular hydraulic press 200 adjacent to a chamber opening 104 of a combustion chamber housing 100. A Step 604 further includes positioning a panel 208 and a bar 202 around a perimeter 102 of the chamber opening 104. At least one stand 236a, 236b may be used to retain the panel 208 and the bar 202 at a desired orientation.

In some embodiments, a Step 606 may include positioning a disk 240 in the chamber opening 104, the disk 240 defined by a predetermined annual shape and circumference. The disk 240 has a predetermined annular shape and circumference. The disk 240 is configured to position inside the chamber opening 104, approximately between the U-shaped end 204 of the bar 202 and the C-shaped edge 210 of the panel 208.

A Step 608 comprises displacing a C-shaped edge 210 of the panel 208 towards a U-shaped end 204 of the bar 202. The C-shaped edge 210 of the panel 208 and the U-shaped end 204 of the bar 202 chamber forcibly press the perimeter of the chamber opening 104 against the disk 240 to mold the chamber opening 104 into substantially the same annular shape and circumference of the disk 240.

A Step 610 further comprises applying, with a hydraulic piston 220, a unidirectional force on the panel 208. In some embodiments, the hydraulic piston 220 may telescopically extend to forcibly displace the C-shaped edge 210 of the panel 208 towards the U-shaped end 204 of the bar 202. This is necessary when reforming the chamber opening 104. Conversely, the hydraulic piston 220 is configured to telescopically retract to displace the C-shaped edge 210 of the panel 208 away from the U-shaped end 204 of the bar 202.

Another Step 612 includes adjusting the unidirectional force with a pump 222, or at least one force adjustment member 234a, or both 222, 234a. Thus, both the hydraulic pump 222 and the force adjustment member 234a, 234b may be used to increase or decrease the unidirectional force against the perimeter of the chamber opening 104. In one embodiment, the at least one force adjustment member 234a, 234b is two ⅜" fast nuts.

A final Step 614 comprises pressing the chamber opening 104 inwardly against the disk 240 until the predetermined annual shape and circumference is achieved on the chamber opening 104. As a result of the piston 220 extending against the panel 208, the U-shaped end 204 of the bar 202 and the C-shaped edge 210 of the panel are moved towards each other, causing the chamber opening 104 to be pressed inwardly against the disk 240. Under this stress, the chamber opening 104 conforms to the annular shape and circumference of the disk 240.

While the inventor's above description contains many specificities, these should not be construed as limitations on the scope, but rather as an exemplification of several preferred embodiments thereof. Many other variations are possible. For example, the pump could be a pneumatic pump. Accordingly, the scope should be determined not by the embodiments illustrated, but by the appended claims and their legal equivalents.

What is claimed is:

1. A circular hydraulic press for reforming and resizing a chamber opening in a combustion chamber housing, the press comprising:
   a bar defined by a generally U-shaped end and a pair of free ends;
   a panel defined by a generally C-shaped edge, a mounting edge, and a pair of slotted edges, the pair of slotted edges configured to slidably receive the pair of free ends of the bar;
   a pair of tubes fixedly disposed along the pair of slotted edges of the panel, the pair of tubes configured to receive the pair of free ends of the bar;
   a disk defined by a predetermined shape and circumference, the disk disposed between the C-shaped edge of the panel and the U-shaped end of the bar;
   a hydraulic piston disposed to join with the mounting edge of the panel, the hydraulic piston configured to apply a unidirectional force on the panel;
   a pump configured to generate the unidirectional force being applied on the hydraulic piston, the pump further configured to increase and decrease the unidirectional force; and at least one force adjustment member configured to increase and decrease the unidirectional force in conjunction with, or independently of the pump, whereby the unidirectional force moves the C-shaped edge of the panel towards the U-shaped end of the bar, whereby the unidirectional force presses the C-shaped edge of the panel and the U-shaped end of the bar against the disk.

2. The press of claim 1, further including a bracket having a plurality of fastening apertures and a plurality of adjustment apertures, the bracket disposed to join with the hydraulic piston.

3. The press of claim 2, wherein the bracket has dimensions of 8 inch×2 inch×1 inch.

4. The press of claim 3, further including at least one fastener configured to pass through the plurality of fastening apertures of the bracket for fastening the bracket to the hydraulic piston.

5. The press of claim 4, wherein the at least one fastener is two socket head cap screws having dimensions of about 0.25 inch×3.5 inch×1 inch.

6. The press of claim 5, wherein the at least one force adjustment member is configured to pass through the plurality of adjustment apertures of the bracket for adjusting the unidirectional force.

7. The press of claim 6, wherein the at least one force adjustment member is two ⅜ inch fast nuts.

8. The press of claim 1, further including at least one stand configured to join with the bracket for supporting the press.

9. The press of claim 8, wherein the at least one stand is generally L-shaped and has dimensions of about ⅜ inch× 2.754 inch.

10. The press of claim 1, wherein the mounting edge of the panel comprises a notch configured to mate with the hydraulic piston.

11. The press of claim 1, wherein the bar has a diameter of about ⅜ inch.

12. The press of claim 1, wherein the U-shaped end of the bar has a radius of about 3.25 inches.

13. The press of claim 1, wherein the pair of free ends of the bar have a ⅜ inch-16 thread.

14. The press of claim 1, wherein the pair of tubes has a diameter of about ⅜ inch.

15. The press of claim 1, wherein the C-shaped edge of the panel has a radius of about 3.247 inches.

16. The press of claim 1, wherein the pump is a hydraulic pump having a hydraulic line for forcibly carrying hydraulic fluid to the hydraulic piston.

17. The press of claim 1, wherein the disk comprises a handle.

18. The press of claim 1, further including a fastening tool configured to rotatably manipulate the at least one fastener.

19. A hydraulic press for reforming and resizing a chamber opening in a combustion chamber housing, the press comprising:

a bar defined by a generally U-shaped end and a pair of free ends, the U-shaped end of the bar having a radius of about 3.25 inches;

a panel defined by a generally C-shaped edge, a mounting edge, and a pair of slotted edges, the C-shaped edge having a radius of about 3.247 inches, the mounting edge comprising a notch, the pair of slotted edges configured to slidably receive the pair of free ends of the bar;

a pair of tubes fixedly disposed along the pair of slotted edges of the panel, the pair of tubes configured to receive the pair of free ends of the bar;

a disk defined by a predetermined shape and circumference, the disk disposed between the C-shaped edge of the panel and the U-shaped end of the bar;

a hydraulic piston disposed to join with the mounting edge of the panel, the hydraulic piston configured to apply a unidirectional force on the panel;

a pump configured to generate the unidirectional force being applied on the hydraulic piston, the pump further configured to increase and decrease the unidirectional force;

a bracket having a plurality of fastening apertures and a plurality of adjustment apertures, the bracket disposed to join with the hydraulic piston;

at least one stand configured to support the bracket;

at least one fastener configured to pass through the plurality of fastening apertures of the bracket for fastening the bracket to the hydraulic piston.

at least one force adjustment member configured to pass through the plurality of adjustment apertures of the bracket, the at least one force adjustment member further configured to increase and decrease the unidirectional force in conjunction with the pump, or independently of the pump, whereby the unidirectional force moves the C-shaped edge of the panel towards the U-shaped end of the bar, whereby the unidirectional force presses the C-shaped edge of the panel and the U-shaped end of the bar against the disk.

20. A method for reforming and resizing a chamber opening in a combustion chamber housing, the method comprising:

supporting a circular hydraulic press adjacent to a chamber opening of a combustion chamber housing;

positioning a panel and a bar around a perimeter of the chamber opening;

positioning a disk in the chamber opening, the disk defined by a predetermined annual shape and circumference;

displacing a C-shaped edge of the panel towards a U-shaped end of the bar;

applying, with a hydraulic piston, a unidirectional force on the panel;

adjusting the unidirectional force with a pump, or at least one force adjustment member, or both; and pressing the chamber opening inwardly against the disk until the predetermined annual shape and circumference is achieved on the chamber opening.

* * * * *